United States Patent [19]

Hahn et al.

[11] Patent Number: 5,229,429
[45] Date of Patent: Jul. 20, 1993

[54] EXPANDABLE STYRENE POLYMERS CONTAINING CARBON DIOXIDE AS BLOWING AGENT

[75] Inventors: Klaus Hahn, Kirchheim; Knut Kaempfer; Hans Hintz, both of Ludwigshafen; Anthony Schaefer, Schwetzingen; Michael Riethues; Michael Witt, both of Ludwigshafen, all of Fed. Rep. of Germany

[73] Assignee: BASF Aktiengesellschaft, Ludwigshafen, Fed. Rep. of Germany

[21] Appl. No.: 973,822

[22] Filed: Nov. 9, 1992

[30] Foreign Application Priority Data

Nov. 14, 1991 [DE] Fed. Rep. of Germany ....... 4137405

[51] Int. Cl.$^5$ ................................. C08J 9/08
[52] U.S. Cl. ......................... 521/87; 521/79; 521/94; 521/97; 521/146
[58] Field of Search ........ 521/97, 94, 146, 79, 521/87

[56] References Cited

U.S. PATENT DOCUMENTS

| 4,911,869 | 3/1990 | Meyer et al. | 264/50 |
| 4,925,606 | 5/1990 | Francis et al. | 264/50 |
| 4,964,690 | 10/1990 | Lapplhn et al. | 350/96.2 |

FOREIGN PATENT DOCUMENTS

| 411923 | 8/1990 | European Pat. Off. |
| 3923913 | 2/1991 | Fed. Rep. of Germany. |
| WO90/03998 | 8/1989 | PCT Int'l Appl. |

Primary Examiner—Morton Foelak
Attorney, Agent, or Firm—Keil & Weinkauf

[57] ABSTRACT

The invention relates to expandable styrene polymers containing
a) a styrene polymer,
b) and at least one carbon dioxide absorber, mixed or copolymerized with the above, in an amount of from 0.01 to 50% by weight, based on the sum of a) and b), and
c) a blowing agent or blowing agent mixture in an amount of from 0.5 to 12% by weight, where the blowing agent or blowing agent mixture comprises
$c_1$) from 10 to 100% by weight of carbon dioxide and
$c_2$) from 0 to 90% by weight of at least one further blowing agent.

The invention furthermore relates to the styrene polymers containing a carbon dioxide absorber, to the styrene polymer foams obtainable from the expandable styrene polymers, and to an improved process for impregnating styrene polymers with carbon dioxide-containing blowing agents or blowing agent mixtures.

3 Claims, No Drawings

EXPANDABLE STYRENE POLYMERS CONTAINING CARBON DIOXIDE AS BLOWING AGENT

The present invention relates to expandable styrene polymers which contain carbon dioxide as blowing agent, and to styrene polymers which are particularly suitable for this purpose. In particular, the present invention relates to expandable styrene polymers which have an increased retention capacity for carbon dioxide and to the foams obtainable from these polymers. Furthermore, the present invention relates to an improved process for impregnating styrene polymers with blowing agents or blowing agent mixtures containing carbon dioxide.

Polystyrene foams are currently produced using numerous blowing agents, for example aliphatic hydrocarbons and partially or fully halogenated hydrocarbons. However, in addition to the high costs, these blowing agents have a number of further disadvantages, including flammability (in the case of aliphatic hydrocarbons), a contribution towards atmospheric pollution and the adverse effect on the ozone layer.

Experiments have therefore been carried out using mixtures of carbon dioxide and other blowing agents, such as aliphatic hydrocarbons or fully or partially halogenated hydrocarbons, and pure carbon dioxide has also already been used as a blowing agent.

The use of carbon dioxide as a blowing agent in the production of polystyrene foams has been known for some time. However, it has hitherto been employed virtually exclusively as a blowing agent or blowing agent constituent in the production of polystyrene foams by extrusion. However, the expandable styrene polymers containing carbon dioxide as blowing agent have hitherto had the disadvantage that the carbon dioxide escapes very rapidly from the blowing agent-containing beads.

For example, U.S. Pat. No. 4,911,869 discloses a process for the production of moldings from foams in which inorganic gases, such as carbon dioxide, nitrogen, air, etc., solid carbon dioxide, etc., are used as the blowing agent. As noted in this publication, however, these gases escape rapidly from the polymer particles. In the process indicated, particles of, inter alia, styrene polymers and copolymers are therefore first impregnated with carbon dioxide and expanded at a temperature above the glass transition temperature of the polymer/carbon dioxide mixture, these expanded particles are then re-impregnated in air, nitrogen or gaseous carbon dioxide or in the presence of liquid or solid carbon dioxide, etc., and these re-impregnated expanded particles are subsequently foamed by heating to give foam moldings.

However, this process has a number of disadvantages: a) the carbon dioxide-impregnated styrene polymers must be prefoamed immediately and b) the prefoamed polymers are then re-impregnated before the foaming to give moldings. A process of this type is expensive and complicated.

EP-A 411 923 discloses a polystyrene foam which has been foamed exclusively using carbon dioxide, and a process for the production of this polystyrene foam. In the process, mixtures of carbon dioxide and the styrene polymer are extruded and foamed. Foam sheets produced by this process are suitable, in particular, for applications in the area of thermoforming.

DE-A 3 923 913 discloses a process for the production of foamed plastics in which liquid ammonia and/or liquid carbon dioxide is employed as the blowing agent. It was found that, in particular, the foaming of polystyrene using liquid carbon dioxide gives excellent results.

EP-A 422 850 describes a method for increasing the thermal expandability of direct-injection foams by impregnating a prefoamed sheet with an inorganic gas, such as carbon dioxide, nitrogen, air or another pneumatogen, before heating to achieve the subsequent expansion, giving polymer foam moldings of increased expandability.

WO-A 90/03998 discloses weathering-resistant polymeric molding compositions prepared by adding a polyalkylene glycol having a molecular weight of from 200 to 2000 to a) a matrix comprising a copolymer of styrene, acrylonitrile and from 0 to 50% by weight of methyl methacrylate, N-phenylmaleimide, N-$C_{1-4}$-alkylmaleimide, maleic anhydride or a mixture thereof, and b) an impact modifying amount of a grafted-on EPDM rubber, a grafted-on alkyl acrylate rubber or a mixture thereof, in an amount sufficient to plasticize the polymeric molding and to reduce the discoloration of the polymer under weathering conditions.

None of these documents describes expandable styrene polymers having a high retention capacity for carbon dioxide.

It is an object of the present invention to provide an expandable styrene polymer which contains carbon dioxide as blowing agent and has an improved retention capacity for carbon dioxide. A further object of the present invention was to provide an expandable styrene polymer which can be impregnated with carbon dioxide more easily, i.e. in particular more quickly.

We have found that, surprisingly, these objects are achieved by styrene polymers which contain absorbers for carbon dioxide, also referred to below as carbon dioxide absorbers, mixed or copolymerized with the above.

The present invention accordingly provides an expandable styrene polymer which contains a styrene polymer a), at least one carbon dioxide absorber b), mixed or copolymerized with the above, in an amount of from 0.01 to 50% by weight, based on the sum of a) and b), and a blowing agent or blowing agent mixture c) in an amount of from 0.5 to 12% by weight, based on the sum of a) and b), where the blowing agent or blowing agent mixture comprises from 10 to 100% by weight of carbon dioxide ($c_1$) and from 0 to 90% by weight of at least one further blowing agent ($c_2$).

The present invention also provides a styrene polymer foam having a density of from 0.005 to 0.2 g/cm$^2$ and containing at least one carbon dioxide absorber b), mixed or copolymerized with the styrene polymer, in an amount of from 0.01 to 50% by weight.

The present invention also relates to the styrene polymer on which the expandable styrene polymer according to the invention is based, which contains at least one carbon dioxide absorber b), mixed or copolymerized with the styrene polymer, in an amount of from 0.01 to 50% by weight, based on the sum of a) and b).

The present invention also provides an improved process for impregnating styrene polymers with carbon dioxide, in which a styrene polymer a) which contains at least one carbon dioxide absorber b), mixed or copolymerized with the above, in an amount of from 0.01 to 50% by weight, based on the sum of a) and b), is impregnated with a blowing agent or blowing agent mixture c) which comprises from 10 to 100% by weight of carbon dioxide ($c_1$) and from 0 to 90% by weight of at least one further blowing agent ($c_2$).

The carbon dioxide absorber b) is preferably employed in an amount of from 0.02 to 30% by weight, particularly preferably from 1 to 20% by weight, based on the sum of a) and b).

As component a), the novel product contains polystyrene and/or a styrene copolymer containing at least 50% by weight, preferably at least 80% by weight, of copolymerized styrene. Examples of suitable comonomers are α-methylstyrene, ring-halogenated styrenes, ring-alkylated styrenes, acrylonitrile, esters of acrylic or methacrylic acid with alcohols having 1 to 8 carbon atoms, N-vinylcarbazole, maleic acid and maleic anhydride. The styrene polymer advantageously contains a small amount of a copolymerized branching agent, i.e. a compound containing more than one, preferably 2, double bonds. The branching agent is generally used in an amount of from 0.005 to 0.1% by weight, based on styrene.

It is also possible to use mixtures of different styrene polymers as described, for example, in DE-A 3 901 329, 3 908 238, 3 936 596, 3 931 862 and 3 916 602.

It is advantageous to use a styrene polymer having a viscosity (0.5% strength in toluene at 25° C.) of from 55 to 85 [ml/g], preferably from 60 to 80 [ml/g], and a melt flow index MFI (190° C., 3.8 kp) of from 5 to 30 [g/10 min], preferably from 7.5 to 20 [g/10 min]. The greatly reduced melt flow index compared with conventional styrene polymers having the same viscosity is characteristic of branched styrene polymers containing from 0.2 to 2.5, preferably from 0.2 to 1.0, branching points per 1000 monomer units (cf. DE-A 4 038 043).

The mean molecular weight of the styrene polymer is generally from 150,000 to 400,000, preferably from 180,000 to 270,000. The proportion having a molecular weight of less than 200,000 is generally from 30 to 80% by weight, preferably from 40 to 70% by weight. The component of the styrene polymer which has a molecular weight of less than 200,000 advantageously contains from 0.25 to 3, preferably from 0.5 to 2.5, branches per 1000 monomer units.

The expandable styrene polymers according to the invention are generally in the form of small, discrete particles, for example beads or microgranules.

The novel styrene polymers a) and expandable styrene polymers contain, as the essential constituents, from 0.1 to 50% by weight, based on the sum of a) and b), of at least one carbon dioxide absorber b).

The carbon dioxide absorber according to the invention binds the carbon dioxide physically and/or chemically.

Carbon dioxide absorbers which are suitable according to the invention include ethylene carbonate, propylene carbonate, butoxydiethylene glycol acetate ($CH_3COO(CH_2CH_2O)_2C_4H_9$), methoxydiethylene glycol acetate, methyl dimethoxyacetate and methyl and ethyl cyanoacetate.

Other suitable carbon dioxide absorbers are ketones, in particular 4-methyl-2-pentanone, 2,6-dimethyl-4-heptanone, 4-methyl-3-penten-2-one, 2,4-pentanedione, acetoxyacetone, 2,5-hexanedione, 4-hydroxy-4-methyl-2-pentanone and 2-methoxy-2-methyl-4-pentanone.

Further carbon dioxide absorbers which are suitable according to the invention are the compounds of the formula I

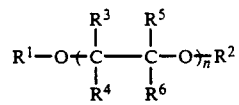

in which, independently of one another, $R^1$ to $R^6$ are identical to or different from one another and are hydrogen or $C_1$-$C_{10}$-alkyl, and n is from 1 to 1500.

Examples of these are polyethylene glycol, polyethylene glycol dimethyl ether, poly-1,2-propylene glycol and ethylene glycol monomethyl ether. Further examples are methyl isopropyl ethers of polyethylene glycols containing 2 to 8 —($CH_2$—$CH_2$—O) units (for example Sepasolv ®MPE from BASF Aktiengesellschaft).

Due to the low water solubility, preference is given to compounds of the formula I in which at least one of the radicals $R^1$ and $R^2$ is $C_1$-$C_{10}$-alkyl.

Polyethylene glycol dimethyl ether is particularly suitable. The polyethylene glycol dimethyl ethers employed according to the invention have a molecular weight of from 134 to 50,000, preferably from 500 to 5000, and are commercially available.

Also suitable are poly-1,3-propylene glycol and the derivatives thereof, in particular the dialkyl ethers.

Polyethylenimines are likewise suitable according to the invention as carbon dioxide absorbers.

A further group of carbon dioxide absorbers which are suitable according to the invention comprises amines. Tertiary amines are preferred, and hydroxyl-containing tertiary amines are very particularly preferred. Examples of these are dimethylethanolamine and N,N'-bis(2-hydroxyethyl)octadecylamine.

The carbon dioxide absorbers can be used alone or in mixtures. Of the groups of carbon dioxide absorbers described above, preference is given according to the invention to the compounds of the formula I.

The carbon dioxide absorbers can be introduced into the styrene polymer by mixing in the melt in an extruder with subsequent granulation or by mixing with the polymerization medium. However, the carbon dioxide absorbers can also be incorporated into the polymer structure during the polymerization in the form of appropriately substituted styrene monomers or comonomers.

The expandable styrene polymers contain a blowing agent or blowing agent mixture c) in an amount, based on the sum of a) and b), of from 0.5 to 12% by weight, preferably from 1 to 10% by weight, particularly preferably from 1.5 to 8% by weight. The blowing agent or blowing agent mixture c) comprises from 10 to 100% by weight of carbon dioxide $c_1$) and from 0 to 90% by weight of at least one further blowing agent $c_2$).

The expandable styrene polymers may contain, as the further blowing agent $c_2$), at least one $C_3$- to $C_8$-hydrocarbon, such as propane, butane, isobutane, n-pentane, i-pentane, neopentane, hexane, heptane or octane. Preference is given to a commercially available pentane mixture or n-octane. Particular preference is given to n-octane.

The effect of the invention is particularly pronounced if the blowing agent used is exclusively carbon dioxide.

Depending on the preparation of the styrene polymer containing the carbon dioxide absorber, the impregnation with the blowing agent or blowing agent mixture c) is carried out during or after the polymerization.

The styrene polymer particles may also contain other additives which provide the expandable products with certain properties, for example flameproofing agents based on organic bromine or chlorine compounds, such as trisdibromopropyl phosphate, hexabromocyclododecane and chlorinated paraffin, and synergists for flameproofing agents, such as dicumyl and highly reactive organic peroxides; furthermore antistatics, stabilizers, dyes, lubricants, fillers and substances which have an antiadhesive action during prefoaming, such as zinc stearate, melamine-formaldehyde condensates or silicic acid, and agents for shortening the demolding time during final foaming, for example glycerol esters or hydroxycarboxylic acid esters. Depending on the intended action, the additives may be distributed homogeneously in the particles or may be in the form of a surface coating.

Other suitable additives are poly(2,6-dimethyl)-1,4-phenylene ether and poly-1,4-phenylene sulfide (cf. DE-A-3 904 370 and DE-A-3 924 868). These additives increase the heat distortion resistance of the foam. Other suitable additives are styrene-soluble elastomers (cf. DE-A-3 915 602), which increase the elasticity of the foam.

Other suitable additives are finely divided organic polymers having a high water-absorption capacity (cf. DE-A-4 014 261). These additives improve the flow properties.

In a preferred process, the expandable styrene polymer according to the invention is prepared by polymerizing styrene, in the presence or absence of comonomers, in aqueous suspension, it being possible to add the above-described carbon dioxide absorber, blowing agent and any additives before, during or after the polymerization. Depending on the water solubility of the carbon dioxide absorber, it may be advantageous to delay incorporation of the carbon dioxide absorber into the styrene polymer a) until the latter has been melted in the extruder. In the latter case, the impregnation with carbon dioxide is carried out in the extruder or by post-impregnation of the granules (for example by direct gassing or in aqueous suspension).

It is usual to use from 0.005 to 1% by weight, preferably from 0.01 to 0.75% by weight, in particular from 0.02 to 0.5% by weight, of a regulator having a chain-transfer constant K of from 0.1 to 50, preferably from 1 to 30, as described in EP-B-106 129 and DE-A-3 921 148. Examples of suitable regulators are thiols, such as n-dodecyl mercaptan (K=19), tert.-dodecyl mercaptan (K=3), n-butyl mercaptan (K=22) and tert.-butyl mercaptan (K=3.6), furthermore pentaphenylethane (K=2.0) and dimeric α-methylstyrene (K=0.5).

Suitable branching agents, which are generally used in amounts of from 0.001 to 0.1% by weight, preferably from 0.005 to 0.05% by weight, are monomers containing more than one, preferably two, polymerizable double bonds, such as butadiene, isoprene, vinylcyclohexene, vinyl acrylate, divinylbenzene, glycol dimethacrylate, butanediol diacrylate, butanediol dimethacrylate and hexanediol diacrylate. The regulator and branching agent are either introduced before commencement of the polymerization or are not added to the batch until during the polymerization, for example at a conversion of from 20 to 80%. In an advantageous procedure, the regulator is introduced before the polymerization and the branching agent is added during the polymerization.

Simultaneous use of a regulator and branching agent gives a branched styrene polymer which has a conventional molecular weight and is distinguished by a particularly high expansion capacity.

The content of free, un-copolymerized styrene in the expandable styrene polymer should generally be low and is usually less than 0.2% by weight, preferably less than 0.1% by weight, in particular less than 0.08% by weight. In order to achieve this aim, it is expedient, if a mercaptan is used as the regulator, to delay addition thereof until during the polymerization, at a conversion of from 20 to 90%.

The blowing agent-containing styrene polymer particles according to the invention are preferably in bead form and generally have a diameter of from 0.2 to 4 mm. They can be prefoamed by conventional methods, for example using steam, to give foam particles having a diameter of from 0.5 to 2 cm and a density of from 0.004 to 0.1 g/cm$^3$.

The prefoamed particles can then be foamed to completion by conventional methods to give foam moldings having a density of from 0.005 to 0.2 g/cm$^3$.

EXAMPLES 1 to 10 and COMPARATIVE EXAMPLES 1 to 6

Carbon dioxide absorbers were used in Examples 1 to 10, while carbon dioxide absorbers were not used in Comparative Examples 1 to 5. The carbon dioxide absorbers employed were dimethylethanolamine, polyethylene glycol dimethyl ether (mean molecular weight: 500) and N,N'-bis(2-hydroxyethyl)octadecylamine. In the Examples, parts and percentages are by weight.

In Examples 1 to 5, the carbon dioxide absorber and in some cases n-octane were introduced before commencement of the polymerization. In Examples 6 to 10, the carbon dioxide absorber was admixed with the styrene polymer, in some cases containing n-octane, in the melt in the extruder.

Preparation of the styrene polymers containing carbon dioxide absorber

A mixture of 150 parts of water, 0.1 part of sodium pyrophosphate, 100 parts of styrene, 0.45 part of benzoyl peroxide and 0.15 part of tert.-butyl perbenzoate was heated to 90° C. with stirring in a pressure-tight stirred reactor. In Examples 1 to 5, the amounts indicated in Table 1 of carbon dioxide absorber and n-octane were additionally introduced. In Example 8 and Comparative Example 4, n-octane in the amount indicated in Table 2 was additionally introduced.

After 2 hours at 90° C., 4 parts of a 10% strength aqueous solution of polyvinylpyrrolidone were added. The mixture was then stirred for a further 2 hours at 90° C., subsequently for 2 hours at 100° C. and finally for 2 hours at 120° C.

The bead polymer obtained, having a mean particle diameter of 1.0 mm, was isolated, washed and dried.

The bead polymers of Examples 6 to 10 and Comparative Examples 3 to 6 (viscosity 75 ml/g), were plasticated in a heated twin-screw extruder (type ZSK 120) and extruded at a material temperature of 130° C. through a breaker plate (hole diameter 5 mm) into a water bath at 20° C. After a residence time of 15 seconds, the polymer extrudate was fed to a granulator via deflection rolls. Examples 6 to 10 were carried out with addition of 5% by weight, based on the sum of styrene polymer a) and carbon dioxide absorber b), of a carbon dioxide absorber. Impregnation with carbon dioxide In each case, 200 g of the dried bead polymers of Examples 1 to 5 and Comparative Examples 1 and 2 and the granules of Examples 6 to 9 and Comparative Examples 3 to 5 were impregnated for 12 hours at 25° C. and a carbon dioxide pressure of 20 bar in a pressure-tight autoclave. Example 10 and Comparative Example 6 differed in that the impregnation was carried out for 4 hours and 6 hours respectively.

Expandability

The expandability was determined using a metal-framed screen (mesh width from 0.1 to 0.2 mm) measuring 1000×800×250 mm which was installed in a sealed metal housing with steam inlet and outlet.

nificantly more slowly than does the styrene polymer of Comparative Example 5, which contains no carbon dioxide absorber.

In Example 10 according to the invention (5% by weight of polyethylene glycol dimethyl ether having a mean molecular weight of 500), a bulk density of 60 g/l was achieved after an impregnation time of 4 hours. In Comparative Example 6 (no carbon dioxide absorber), by contrast, a bulk density of only 294 g/l was achieved even after an impregnation time of 6 hours.

TABLE 1

| Example No. | Carbon dioxide absorber | Amount added during the polymerization [parts] | n-octane [%] | Impregnation with $CO_2$ $CO_2$ pressure [bar] | Temperature [°C.] | Bulk density [g/l] |
|---|---|---|---|---|---|---|
| 1 | Dimethylethanolamine | 5 | — | 35 | 25 | 39 |
| 2 | Dimethylethanolamine | 5 | 1 | 20 | 25 | 24 |
| 3 | N,N'-bis(2-hydroxyethyl)octadecylamine | 5 | — | 10 | 0 | 42 |
| 4 | Polyethylene glycol dimethyl ether | 5 | — | 10 | 25 | 86 |
| 5 | Polyethylene glycol dimethyl ether | 5 | 1 | 10 | 25 | 36 |
| 1 (comp.) | — | — | — | 10 | 25 | 127 |
| 2 (comp.) | — | — | — | 20 | 25 | 101 |

TABLE 2

| Example No. | Carbon dioxide absorber | Amount added in the extruder [parts] | n-octane [%] | Bulk density [g/l] |
|---|---|---|---|---|
| 6 | N,N'-bis(2-hydroxyethyl)-octadecylamine | 5 | — | 73 |
| 7 | Polyethylene glycol dimethyl ether | 5 | — | 25 |
| 8 | Polyethylene glycol dimethyl ether | 5 | 2 | 49 |
| 3 (comp.) | — | — | — | 223 |
| 4 (comp.) | — | — | 2 | 111 |

The steam at 105° C. was passed into the prefoaming apparatus from the bottom, passed through the mesh holding the products to be tested and escaped again through the steam outlet. Before the tests were commenced, the apparatus was first preheated for about 5 minutes. 100 g of the expandable bead polymers having a particle diameter of from 0.5 to 1.5 mm were subsequently distributed uniformly on the mesh, the apparatus was closed and the steam valve was opened. After 6 minutes, the steam valve was closed again and the metal housing was opened. After interim storage for 12 hours, the prefoamed beads were again foamed for 6 minutes in the prefoaming apparatus. The bulk density of the prefoamed material was subsequently measured. The results (bulk densities) are shown in Tables 1 and 2.

The bulk density of the prefoamed, expandable styrene polymer of Example 9 according to the invention and of Comparative Example 5 was measured immediately and after 1, 2, 3, 4 and 5 hours. The results are shown in Table 3.

It was found that the styrene polymer of Example 9, which contains carbon dioxide absorber, is impregnated significantly more easily (i.e. more rapidly) with carbon dioxide and releases the carbon dioxide it contains sig-

TABLE 3

| Time after impregnation [hours] | Bulk density [g/l] | |
|---|---|---|
| | Example No. 9 | Example No. 5 (Comp.) |
| 0 | 60 | 171 |
| 1 | 85 | 224 |
| 2 | 123 | 342 |
| 3 | 160 | 406 |
| 4 | 207 | 456 |
| 5 | 240 | 495 |

We claim:
1. An expandable styrene polymer containing
   a) a styrene polymer,
   b) at least one carbon dioxide absorber, wherein the carbon dioxide absorber is a compound of the formula I

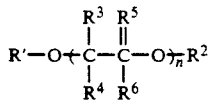

in which R' to $R^6$ are identical to or different from one another and are hydrogen or $C_1$–$C_{10}$-alkyl, and n is from 1 to 1500 or an amine, mixed or copolymerized with the above, in an amount of from 0.01 to 50% by weight, based on the sum of a) and b), and c) a blowing agent or blowing agent mixture in an amount of from 0.5 to 12% by weight, where the blowing agent or blowing agent mixture comprises $c_1$) from 10 to 100% by weight of carbon dioxide and
$c_2$) from 0 to 90% by weight of at least one further blowing agent.

2. An expandable styrene polymer as claimed in claim 1, wherein at least one of the radicals $R^1$ and $R^2$ in the compound of the formula I is $C_1$–$C_{10}$-alkyl.

3. An expandable styrene polymer as claimed in claim 2, wherein the carbon dioxide absorber is a polyalkylene glycol dimethyl ether having a molecular weight of from 134 to 50,000.

* * * * *